(12) United States Patent  (10) Patent No.: US 6,726,007 B2
Huang  (45) Date of Patent: Apr. 27, 2004

(54) COMPACT DISC STORAGE CASE

(76) Inventor: Michael Huang, 8527 E. Beverly Dr., San Gabriel, CA (US) 91775

( * ) Notice: Subject to any disclaimer, the term of this patent is extended or adjusted under 35 U.S.C. 154(b) by 0 days.

(21) Appl. No.: 10/457,241

(22) Filed: Jun. 9, 2003

(65) Prior Publication Data

US 2003/0205491 A1 Nov. 6, 2003

Related U.S. Application Data

(63) Continuation-in-part of application No. 09/972,460, filed on Oct. 5, 2001, now abandoned.

(51) Int. Cl.[7] ............................................... B65D 85/57
(52) U.S. Cl. ..................................... 206/308.1; 206/310
(58) Field of Search ....................... 206/308.1, 309–313, 206/493

(56) References Cited

U.S. PATENT DOCUMENTS

| 5,555,977 | A | * | 9/1996 | Oshry et al. ............. 206/308.1 |
| 5,713,463 | A |   | 2/1998 | Lakoski et al. |
| 5,769,217 | A |   | 6/1998 | Derraugh et al. |
| 5,788,069 | A | * | 8/1998 | Calhoun et al. ............ 206/312 |
| 6,050,404 | A |   | 4/2000 | Lee |
| 6,216,862 | B1 | * | 4/2001 | Chang ..................... 206/308.1 |
| 6,298,986 | B1 | * | 10/2001 | Chang ........................ 206/310 |

FOREIGN PATENT DOCUMENTS

WO    WO 01/62628 A1    8/2001

* cited by examiner

*Primary Examiner*—Luan K. Bui
(74) *Attorney, Agent, or Firm*—Chan Law Group LC

(57) ABSTRACT

The invention is a slim, rigid, transparent, one-piece compact disc storage case with two holes for mounting it in a three-ring type binder and two slots for mounting it onto a card index rail, such as those found on a desk-top holder manufactured by the Rolodex Corporation. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

1 Claim, 4 Drawing Sheets

COMPACT DISC STORAGE CASE

CROSS-REFERENCE TO RELATED APPLICATIONS

This application is a continuation-in-part of application Ser. No. 09/972,460 filed Oct. 5, 2001, abandoned.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of Invention

This invention pertains generally to a compact disc storage case, and more particularly, to a slim, storable, one-piece compact disc storage case.

2. Background Information

The past decade has witnessed the emergence of the compact disc as a preferred data storage medium in various commercial industries. The movie industry uses DVD's to store movies, the music industry uses compact discs to store and play musical recordings, the video game industry uses compact discs to store and play video games, and the computer industry uses compact discs to store and use software applications.

Many compact disc music albums, software applications and movies are recorded on multiple compact discs. Multiple compact disc applications must be packaged in storable and sort able fashion.

Most compact discs are packaged and sold in a plastic case, commonly referred to as a "jewel box". The typical jewel box is brittle and breaks easily when mishandled or dropped on a hard surface. Once broken, the jewel boxes are incapable of adequately protecting the enclosed compact disc, and thus the compact disc will be exposed to dust, debris or damage. Further, the large size and weight of the jewel box encased compact disc makes it difficult for the user to transport and store many compact discs.

Many prior art multi-compact disc storage devices have been developed. These devices generally have a plurality of individual compact disc holders contained within a compact disc holder storage case. The individual compact disc holders vary from a rigid case to a flexible sleeve. Some type of attachment or separation means is employed to differentiate and sort the compact disc holders within the compact disc holder storage case. Spiral bound compact disc holders or compact disc holder slots within the compact disc holder storage device are some of the attachment and separation means that have been developed. A specially shaped and sized compact disc holder storage case holds the stored compact disc holders.

The size, shape and appearance of the particularly conceived compact disc holder storage cases limit their appeal. The compact disc holder only functions within the storage device specifically designed to hold it. The fixed number of compact disc holders of the particular compact disc holder storage case inflexibly limits the user. The compact disc holder storage case often has no means to expand or reduce the number of compact disc holders that it contains. These storage devices are often relatively expensive, bulky, difficult to use and do not allow the user to store other forms of information such as paper or index cards with the compact disc holders.

BRIEF SUMMARY OF THE INVENTION

The invention is a slim, rigid, transparent, one-piece compact disc storage case with two holes for mounting it in a three-ring type binder and two slots for mounting it onto a card index rail. The card index rail is the type found on a desktop holder such as those manufactured by the Rolodex Corporation.

The user of the compact disc storage case invention can store it in a readily available three ring binder or attach it onto a card index rail. The three-ring binder is readily available in many shapes sizes and colors. The same is true for the desktop card index system. Therefore, a user does not have to purchase an odd sized, expensive storage case with its peculiar compact disc holders, but instead use the compact disc storage case invention and store it in a readily available binder or card index file. This gives the user a great deal of flexibility. It also saves the user money because instead of purchasing an expensive compact disc holder storage case system the user purchases only the compact disc storage case invention. The user decides what type, size, shape and appearance binder or card index file satisfies its needs. The compact disc storage case invention functions within either storage device. There is no need for a specifically designed compact disc holder storage case with its specially shaped compact disc holders. The user decides the limit of the number of compact disc holders within of the particular storage case. The user can store a mixture of other forms of information with the compact discs such as paper or index cards.

The foregoing has outlined the more pertinent and important features of the present invention. Additional features of the present invention will be described hereinafter, which form the subject of the claims. It should be appreciated by those skilled in the art that the disclosed specific embodiment might be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only.

DETAILED DESCRIPTION

Figure 1:
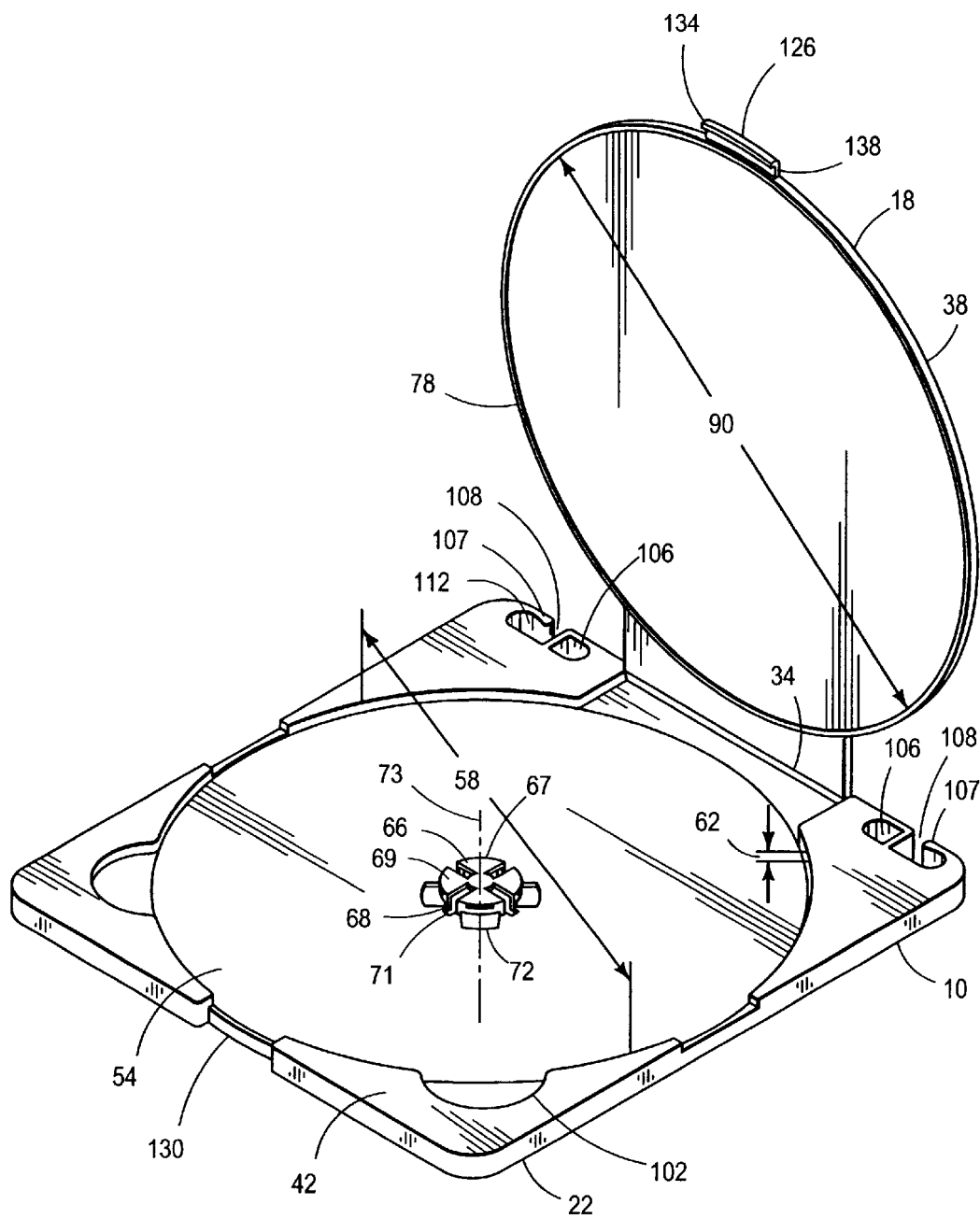
FIG. 1 is an orthogonal view of an open compact disc storage case.
Figures 2, 3:
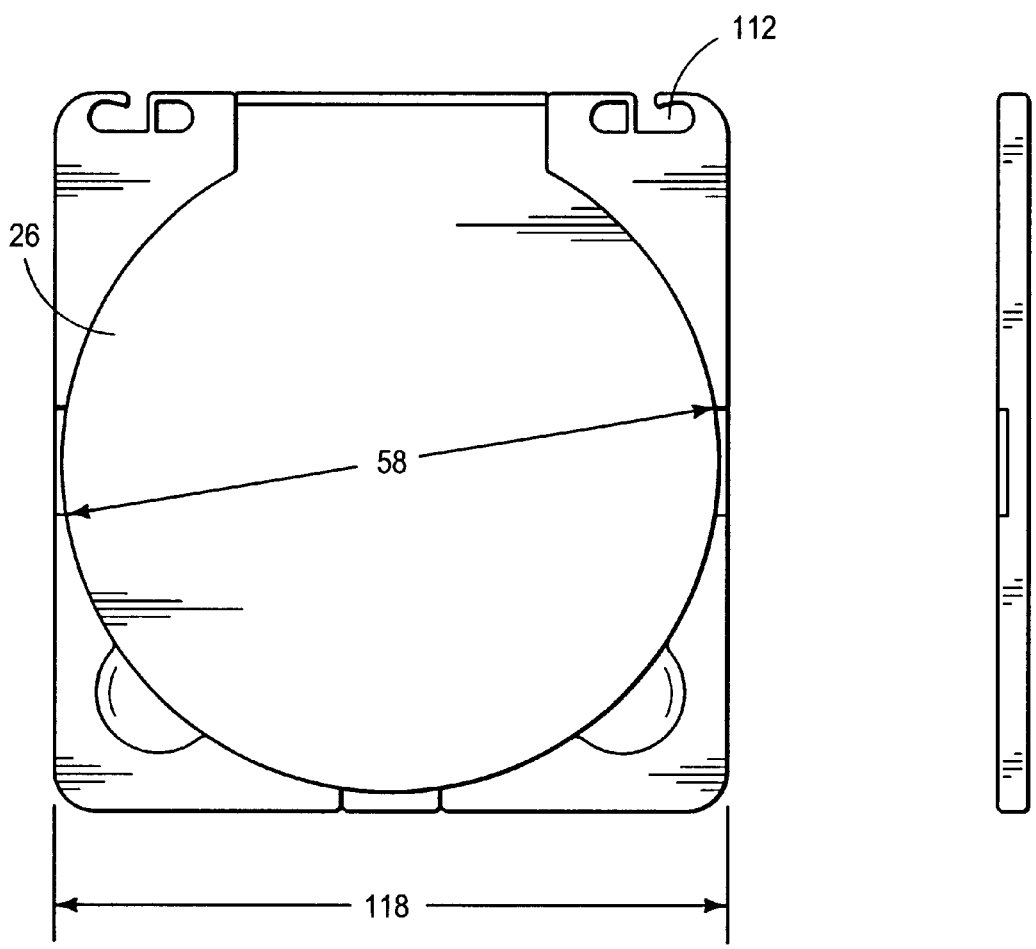
FIG. 2 is a top plan view of a closed compact disc storage case.
FIG. 3 is a side elevation view of a closed compact disc storage case.

The invention is a compact disc storage case 10. The compact disc storage case 10 includes an upper lid 18 hingeably attached to a lower lid 22. The upper lid 18 is generally round with a perimeter edge 38.

A retaining lip 78 protrudes down from the perimeter edge 38 of the upper lid 18. The retaining lip 78 has an inner diameter 90 greater than the outer diameter of a conventional 11.9 cm diameter compact disc.

Figure 4:
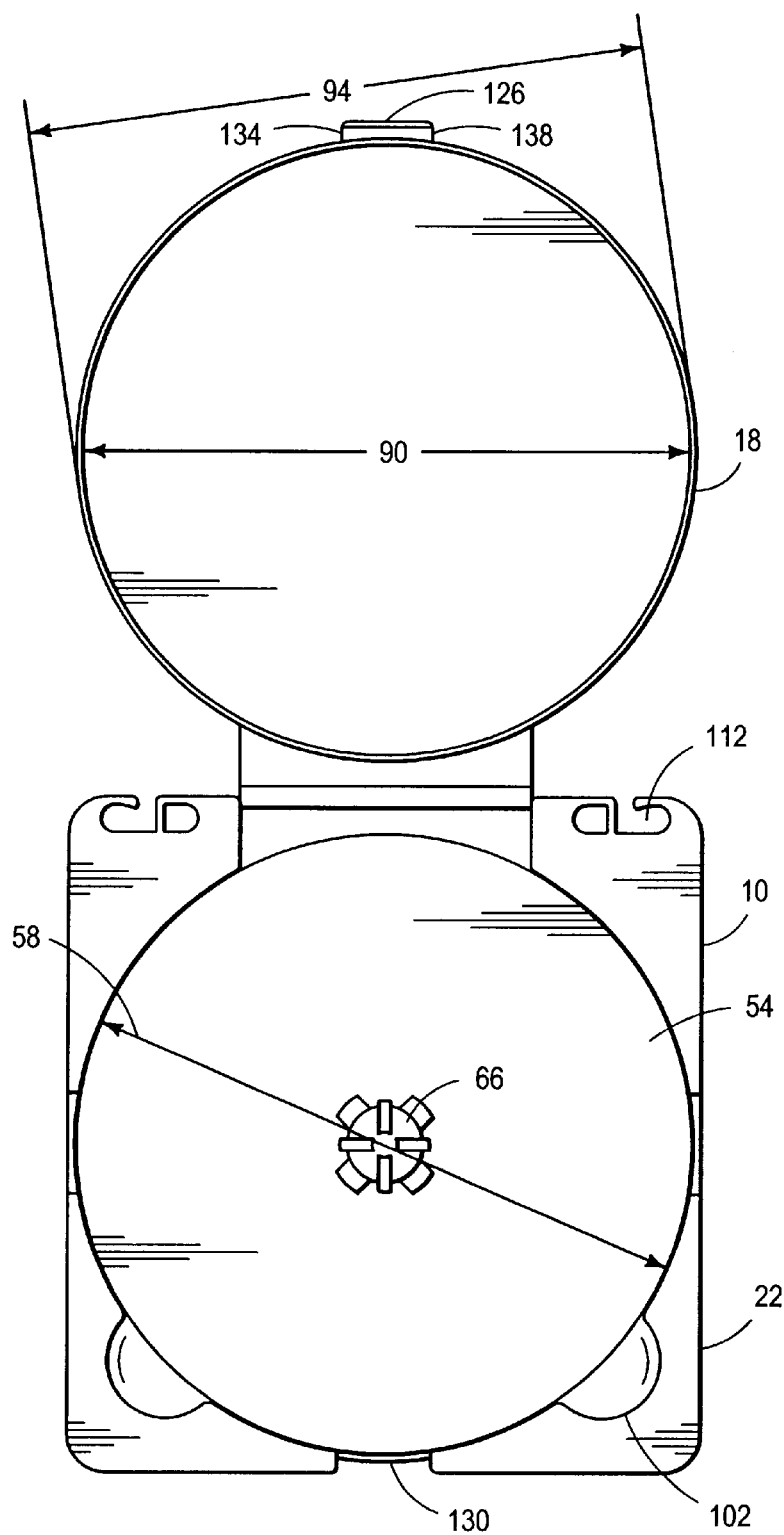
FIG. 4 is a top plan view of an open compact disc storage case.
Figure 5:
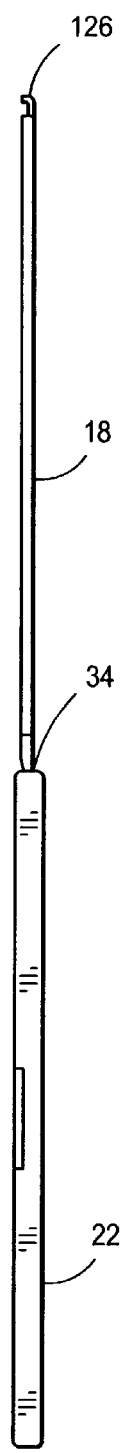
FIG. 5 is a side elevation view of an open compact disc storage case.

The lower lid 22 has a generally rectangular shape. A CD recess 54 is centrally located in the lower lid 22. The CD recess 54 has a depth 62 and an inner diameter 58 greater than the thickness and outer diameter 94 of the upper lid 18, as shown in FIG. 4.

Figure 6:
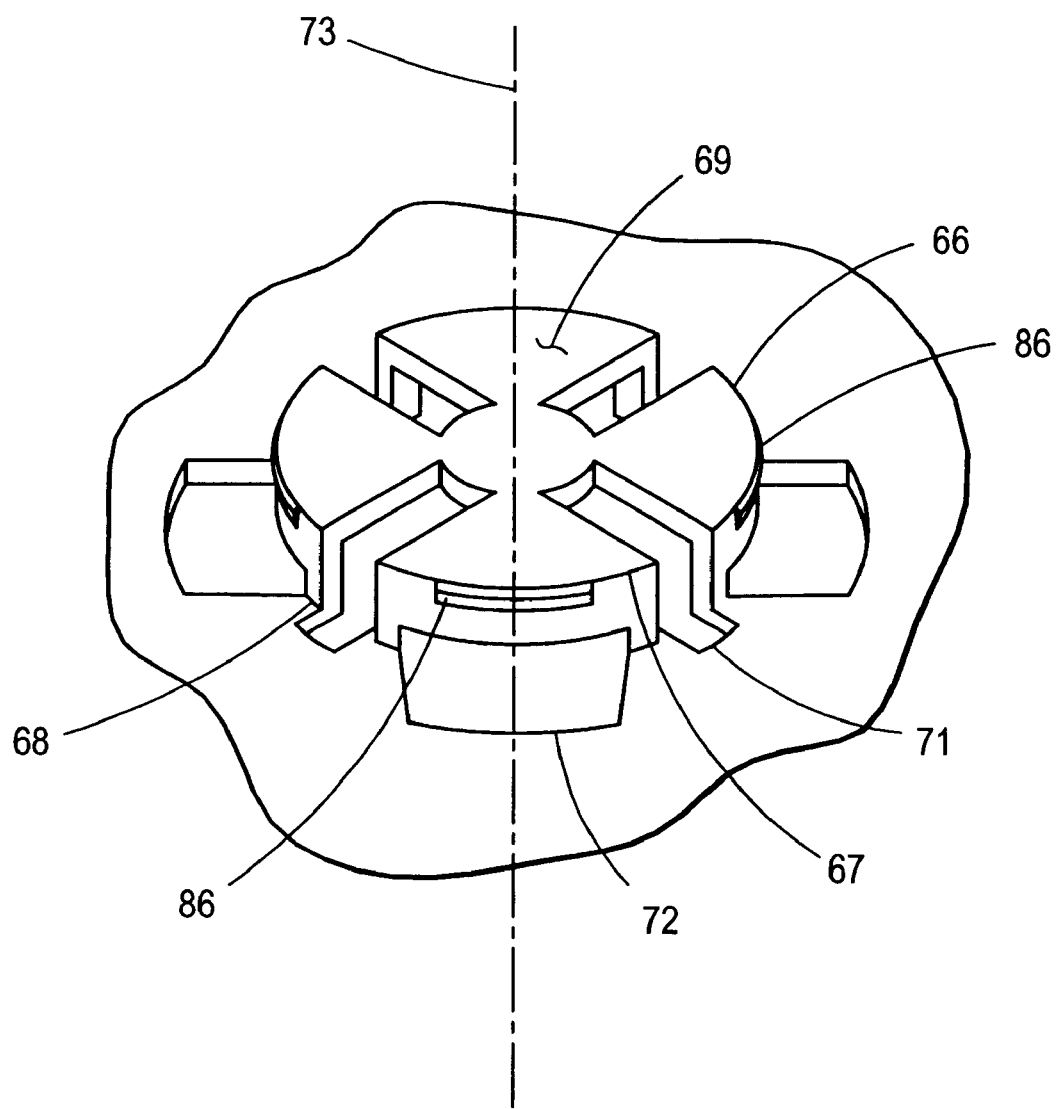
FIG. 6 is an enlarged orthogonal view of the storage case center attachment button.

A raised area 66 is centrally located in the CD recess 54, as shown in FIG. 6. The raised area 66 stands taller above the lower lid 22 than the thickness of a conventional compact disc. The raised area 66 has a circular upper perimeter edge 67 and a circular lower perimeter 68. The circular lower perimeter 68 has an outer diameter less than the inner diameter of the center hole of a conventional compact disc. The raised area 66 has a flat upper surface 69. A plurality of radial slots 71 is cut through the raised area 66, the circular upper perimeter edge 67, the circular lower perimeter 68 and into the CD recess 54. A plurality of tangential slots 72 is located in the CD recess 54 along the lower circular perimeter 68. The radial slots 71 and the tangential slots 72 are rotationally 45 degrees out of phase to each other relative to the centerline 73 of the raised area 66.

A segmented lip 86 is cantilevered from the circular upper perimeter edge 67. The outer diameter of the lip 86 is smaller than the diameter of the central hole of a conventional compact disc. The lip 86 retains the compact disc against the lower lid 22.

Two removal recesses 102 are located on the lower lid 22 to overlap the CD recess 54. Each removal recess 102 is sized and shaped to facilitate access to grip a portion of the edge of a stored compact disc to facilitate its removal.

The lower lid 22 has a pair of "D" shaped holes 106. Both "D" shaped holes 106 are located along the same edge. Each "D" shaped hole 106 is orientated symmetrically opposite the other the "D" shaped hole 106. Both "D" shaped holes 106 are located outside of the CD recess 54. The plurality of "D" shaped holes 106 are sized and located to mate the lower lid 22 to a ringed binder.

The lower lid 22 has a pair of slots 112, as shown in FIG. 1. Each slot 112 is located along the same edge as both the "D" shaped holes 106. Each slot 112 is orientated symmetrically opposite the other the slot 112. Each slot 112 is located adjacent, but outboard from the "D" shaped hole 106. Each slot 112 is located outside of the CD recess 54. Each slot 112 has a hooked aperture 107 and a narrowed offset opening 108 to the edge. The opening 108 and the aperture 107 are sized and shaped to attach onto a card index rail, such as those found on a desktop holder manufactured by the Rolodex Corporation. Each slot 112 is located to mate the lower lid 22 to a pair of card index rails.

A tab 126 is cantilevered radially outboard from the perimeter edge 38 of the upper lid 18. The tab 126 has a first end 134 and a second end 138. A dome-shaped detent protrudes from the first end 134 and the second end 138 of the tab 126.

A tab receiver 130 is located in the lower lid 22 outside of the CD recess 54. The tab receiver 130 has two detent receptacles.

The upper lid 18 is hingeably attached to the lower lid 22. The upper lid 18, hinge 34 and the lower lid 22 are fabricated from a single piece of transparent material.

The upper lid 18 is snap-locked to the lower lid 22 when the dome-shaped detents are aligned into said detent receptacles. The upper surface 26 of the upper lid 18 is then coplanar with the upper surface 42 of the lower lid 22. A CD retention cavity is defined when the lids are snap-locked together.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A compact disc storage case comprising:

an upper lid, said upper lid being substantially rigid with a generally round perimeter edge;

a retaining lip, said retaining lip protruding down from said perimeter edge of said upper lid, said retaining lip having an inner diameter greater than the outer diameter of a compact disc;

a lower lid, said lower lid being substantially rigid and having a generally rectangular shape;

a CD recess, said CD recess being located in said lower lid, said CD recess having a depth and an inner diameter greater than the thickness and outer diameter of the compact disc, respectively;

a raised area, said raised area being located in said CD recess, said raised area having an attachment apparatus sized, shaped and disposed to connect to a center hole of the compact disc, two removal recesses being located on said lower lid to overlap said CD recess, each said removal recess being sized and shaped to facilitate access to grip a portion of the edge of the stored compact disc to ease its removal;

two "D" shaped holes, each said "D" shaped hole being through said lower lid, each said "D" shaped holes hole being located along the same edge of said lower lid, each said "D" shaped hole being orientated symmetrically opposite the other said "D" shaped hole, each said "D" shaped hole being located outside of said CD recess, each said "D" shaped hole being sized and located to mate said lower lid to a ringed binder;

two slots, each said slot being through said lower lid, each said slot being located along the same edge of said lower lid as each said "D" shaped hole, each said slot being orientated symmetrically opposite the other said slot, each said slot being located adjacent, but outboard from a said "D" shaped hole, each said slot being located outside of said CD recess, each said slot having an enlarged hooked aperture and a narrowed offset opening to the edge, said opening and said aperture being sized and shaped to attach to a card index rail, each said slot being located to mate said lower lid to a pair of card index rails;

a tab cantilevered radially outboard from said perimeter edge of said upper lid, said tab having a first end and a second end, a dome-shaped detent protruding from said first end and said second end of said tab;

a tab receiver being located in said lower lid outside of said CD recess, said tab receiver having two detent receptacles;

a hinge;

said upper lid being hingeably attached to said lower lid by said hinge;

said upper lid, said hinge and said lower lid being fabricated from a single piece of transparent material; and a CD retention cavity being defined when the upper surface of said upper lid is coplanar with the upper surface of said lower lid.

* * * * *